United States Patent [19]

Kawai

[11] Patent Number: 5,471,028
[45] Date of Patent: Nov. 28, 1995

[54] RESISTANCE WELDING MACHINE

[75] Inventor: Shingo Kawai, Nagoya, Japan

[73] Assignee: NADEX Co., Ltd., Japan

[21] Appl. No.: 296,415

[22] Filed: Aug. 26, 1994

[30] Foreign Application Priority Data

Aug. 26, 1993 [JP] Japan .................. 5-211666

[51] Int. Cl.$^6$ ........................... B23K 11/24
[52] U.S. Cl. ..................... 219/110; 219/86.51
[58] Field of Search ................... 219/86.51, 110

[56] References Cited

U.S. PATENT DOCUMENTS 4,484,056  11/1984  Rossell ................. 219/86.51
5,386,092   1/1995  Dufrenne .............. 219/86.51

FOREIGN PATENT DOCUMENTS 2-84276  3/1990  Japan .................. 219/86.51

Primary Examiner—Clifford C. Shaw
Attorney, Agent, or Firm—Dennison, Meserole, Pollack & Scheiner

[57] ABSTRACT

A resistance welding machine comprises clamping force representing value measuring means for measuring a clamping force representing value corresponding to a clamping force applied on workpieces by a pair of electrodes, clamping force representing value discriminating means for discriminating whether the clamping force representing value measured by the clamping force representing value measuring means is fluctuating or stabilized, and current supply means for supplying welding current through the electrode pair just after a stabilization timing when the clamping force representing value discriminating means discriminates that the clamping force representing value is stabilized.

8 Claims, 5 Drawing Sheets

5,471,028

RESISTANCE WELDING MACHINE

BACKGROUND OF THE INVENTION

1. Field of the Invention

The present invention relates to a resistance welding machine in which workpieces are tightly clamped by a pair of electrodes and are welded by welding current supplied through the electrode pair.

2. Description of the Prior Art

In a resistance welding machine including a pair of electrodes between which workpieces are tightly clamped to be welded by welding current supplied through the electrode pair, the electrode pain starts a movement to make a distance thereof short when a clamping command is entered to the welding machine. When the distance becomes equal to the thickness of the workpieces, the workpieces are clamped by the electrode pair. In the early stage of the clamping, the clamping force is not stabilized due to bounding and other factors. Thus, welding current through the electrode pair must be started just after a stabilized timing when the workpieces are properly clamped between the electrodes in a stable manner.

To this end, stabilization of the clamping force has been conventionally detected by comparison with a certain constant such as those described below.

Specifically, in a prior art, a time from a timing when the clamping command is entered to the machine until a timing when the clamping force is stabilized is previously measured by an experiment. The welding current flow is started when the elapsed time from the timing when the clamping command is entered exceeds the measured period.

It is also known that the pressure in a cylinder for tightly clamping workpieces between the electrodes is directly related to the clamping force applied on the workpieces, and that, when the workpieces are clamped between the electrodes, members supporting the electrodes develop strain which is indirectly related to the clamping force on the workpieces. Therefore, in another prior art, the value of the pressure in the cylinder or the strain developed in the supporting members at a timing when the clamping force on the workpieces is stabilized is previously measured. The welding current flow is started when the pressure in the cylinder or the strain developed in the supporting member reaches the measured value.

However, the time from when the clamping command is entered until the workpieces are stably clamped, or the cylinder pressure or the strain at a timing when workpieces are stably clamped is variable depending on various welding conditions such as thickness and material of the workpieces.

When it is desired to weld various kinds of workpieces, constants of the time, the cylinder pressure or others must be determined in respective cases so as to start welding current flow according to the respective constants. This is very cumbersome.

Even in workpieces of the same kind, the time from the clamping command entry timing until the stabilized timing may be variable due to difference in the approaching speed of the electrodes. For example, if an air supply device is connected to a plurality of cylinders (air cylinders), there will be difference in speed of driving the cylinder or cylinders between when a single cylinder is actuated and when many cylinders are actuated simultaneously. In such a case, it is very difficult to determine the stabilized timing on the basis of the time from the clamping command entry timing, and consequently to start welding current flow just after the stabilized timing.

SUMMARY OF THE INVENTION

It is an object of the present invention to provide a resistance welding machine which is effective to automatically start welding current flow just after workpieces are properly or stably clamped by a pair of electrodes, irrespective of the welding conditions such as thickness or material of the workpieces and approaching speed of the electrodes.

Another object of the present invention is to provide such a resistance welding machine which is effective to discriminate whether any malfunction has occurred or not.

According to an aspect of the present invention, as shown diagrammatically in FIG. 1, a resistance welding machine includes a pair of electrodes E between which workpieces W are clamped under a clamping command and are welded by welding current supplied through the electrode pair E. The resistance welding machine comprises clamping force representing value measuring means A for measuring a clamping force representing value corresponding to a clamping force applied on the workpieces W by the electrode pair E, clamping force representing value discriminating means B for discriminating or determining whether the clamping force representing value measured by the clamping force representing value measuring means A is fluctuating or stabilized, and current supply means C for supplying the welding current to the electrode pair E just after a stabilized timing when the clamping force representing value discriminating means B discriminates or determines that the clamping force representing value is stabilized.

Various values as described below are applicable to the clamping force representing value. An example of a directly representing value is the inner pressure of a cylinder used to clamp the workpieces W by the electrode pair E. Examples of an indirectly representing value include the distance between the electrode pair E, and strain developed in members supporting the electrode pair E when the workpieces W are clamped between the electrode pair E. The distance between the electrode pair E is not a macro distance measured during the time from when they are apart and approaching to each other, until they clamp the workpieces W, but a micro distance of a slight movement produced during the time from when the workpieces W are held between the electrode pair E until they are clamped thereby under a predetermined pressure.

In the resistance welding machine of the present invention, the clamping force representing means A measures the clamping force representing value corresponding to the clamping force applied on the workpieces W by the electrode pair E, the clamping force representing value discriminating means B discriminates or determines whether the clamping force representing value is fluctuating or stabilized, the means B discriminates or determines that the value is stabilized just after the stabilized timing, and the current supply means C starts to supply welding current through the electrode pair E when the means B discriminates or determines that the value is stabilized.

This assures the welding current flow to be started just after the workpieces W are properly clamped, irrespective of any variations of welding conditions such as thickness and material of the workpieces W. Thus, any difference in the welding conditions such as thickness or material of the workpieces W and approaching speed of the electrode pair E produces no adverse influence on the welding current flow starting timing.

According to this aspect of the present invention, the resistance welding machine as described above further comprises stabilization time discriminating means L which discriminates or determines whether a stabilization time from the clamping command entry timing when the clamping command is entered until the stabilized timing when the clamping force representing value discriminating means B discriminates or determines that the clamping force representing value is stabilized is within a predetermined time range or not.

The stabilization time discriminating means L discriminates or determines whether the stabilization time from the clamping command entry timing until the stabilized timing is within a predetermined time range or not. The predetermined time range can be defined between a minimum time and a maximum time measured when the machine operates normally, so that in case of any malfunction, the stabilization time falls out of the predetermined time range.

The foregoing and other objects, features, aspects and advantages of the present invention will become more fully apparent from the following detailed description of the present invention when taken in conjunction with the accompanying drawings.

DETAILED DESCRIPTION OF THE PREFERRED EMBODIMENT

Now, a resistance welding machine according to a preferred embodiment of the present invention will be described with reference to FIGS. 1 to 5.

Figure 1:
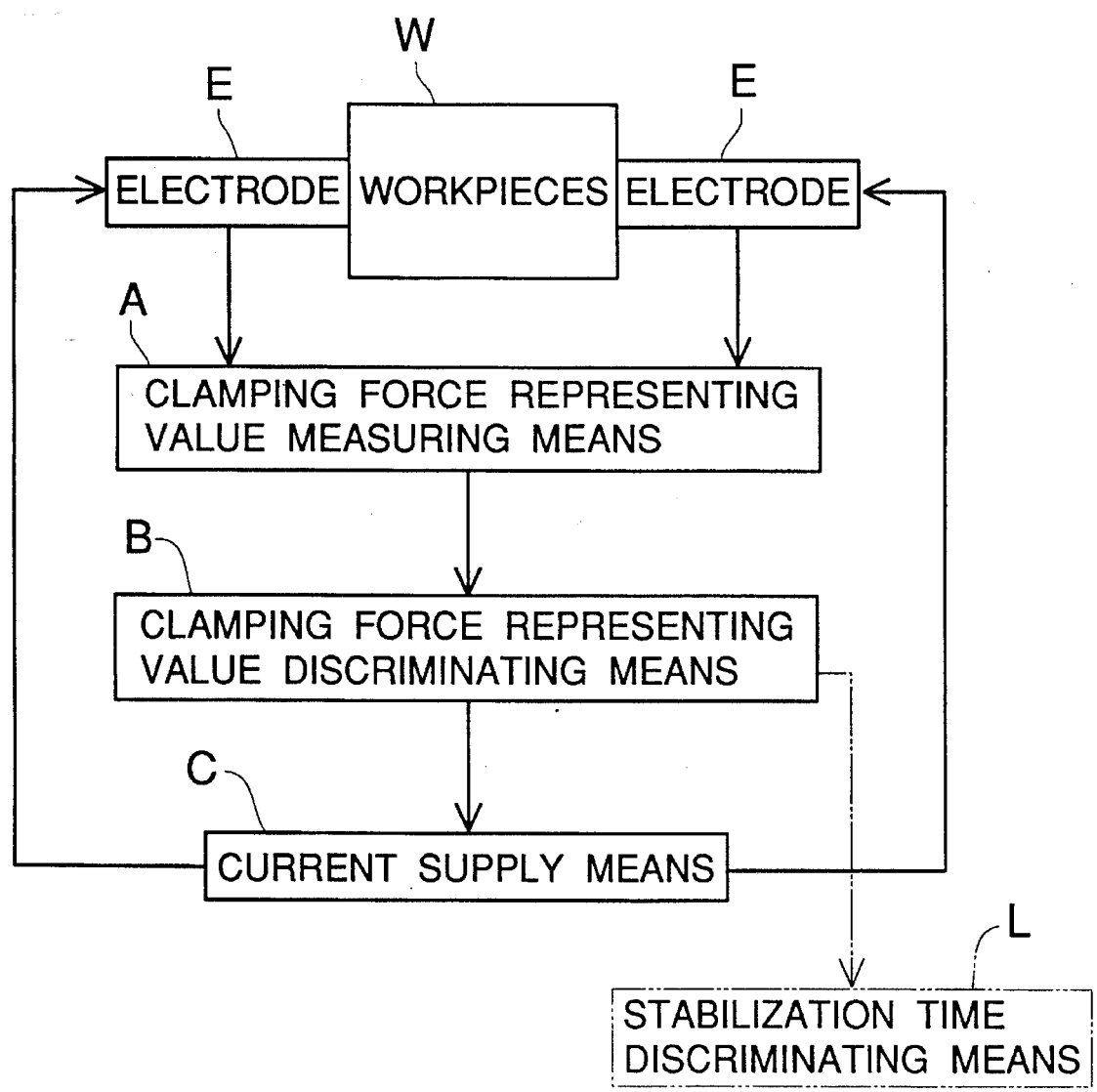
FIG. 1 is a block diagram of the present invention.
Figure 2:
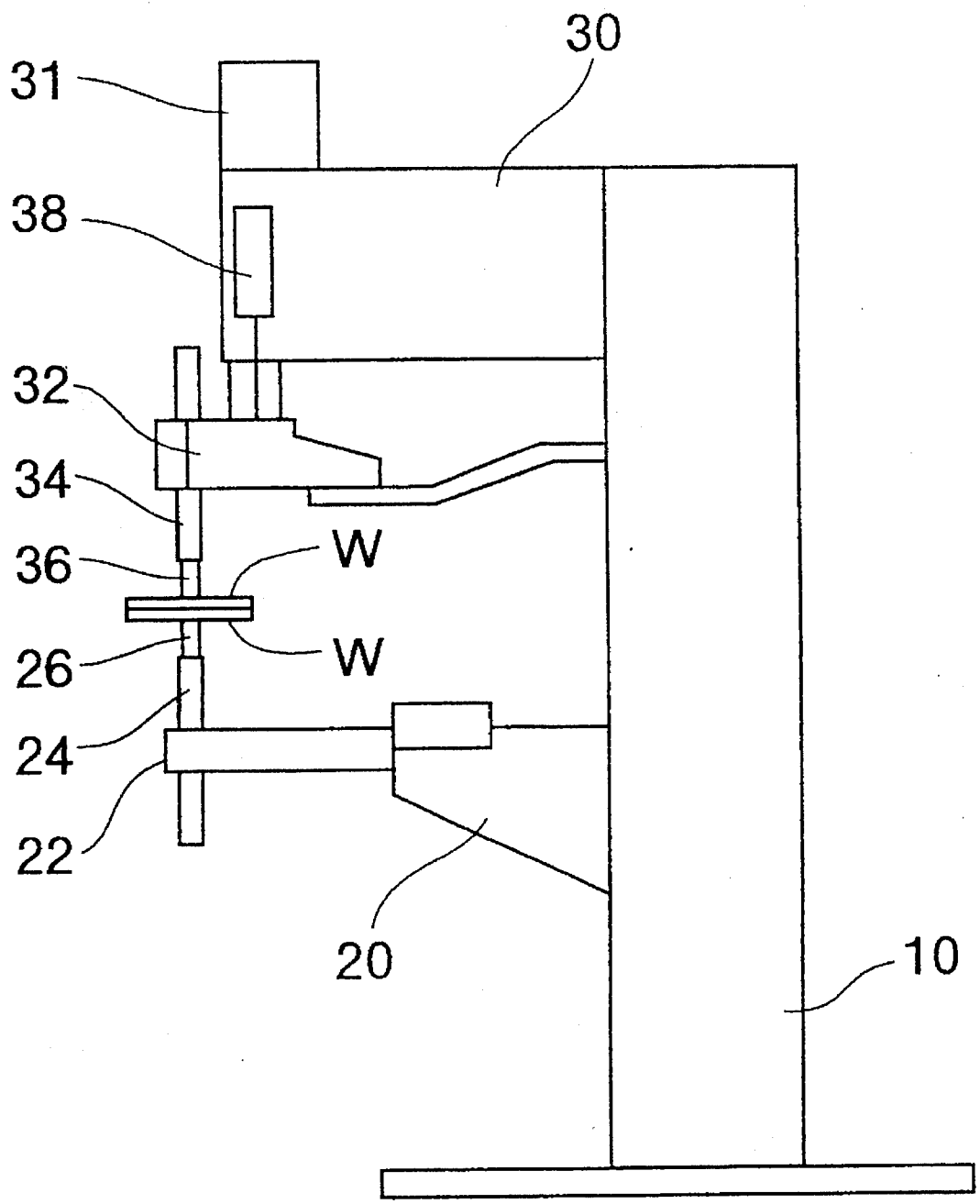
FIG. 2 is a side view of a resistance welding machine according to an embodiment of the present invention.
Figure 3:
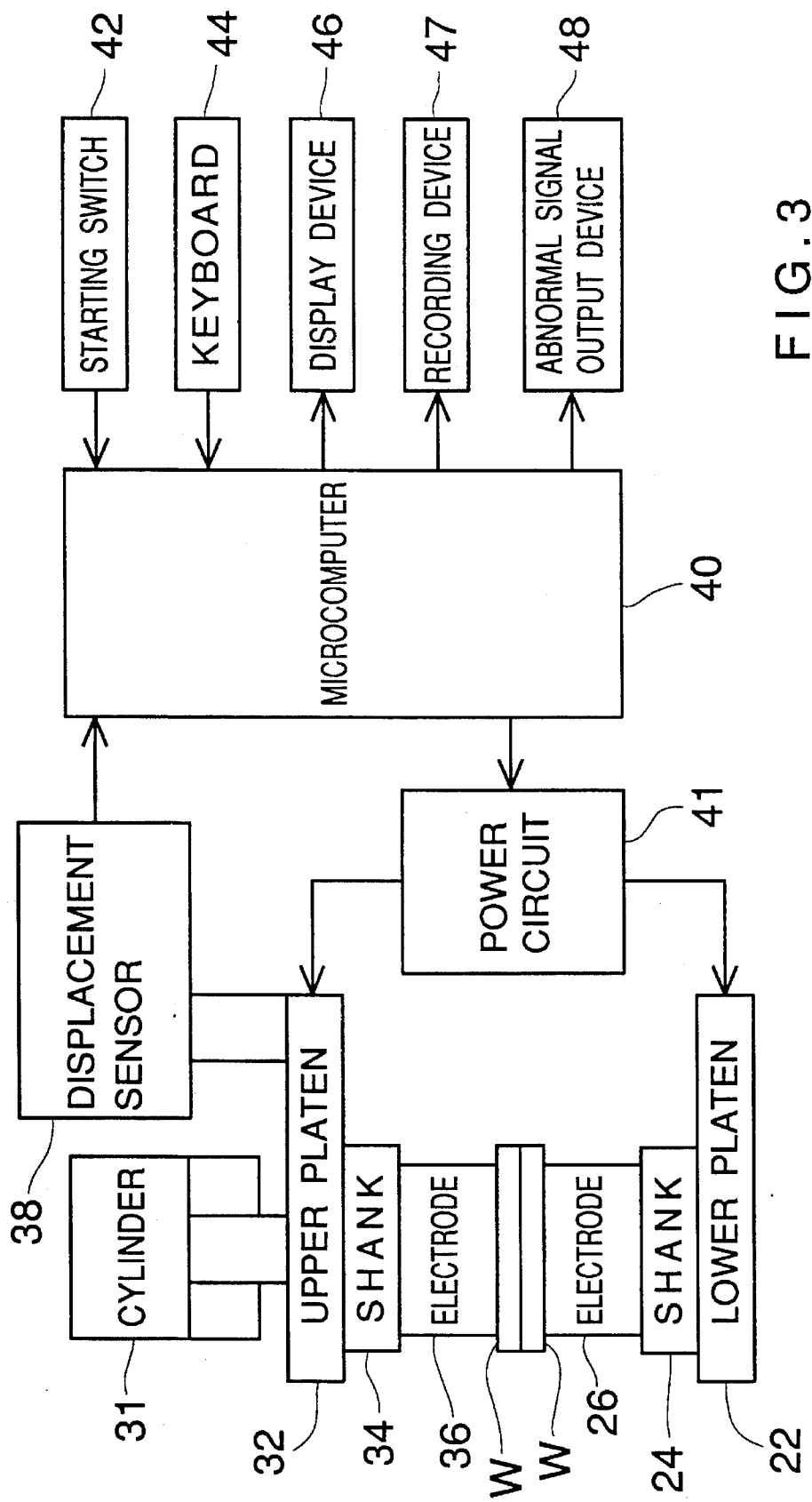
FIG. 3 is a block diagram of the essential parts in FIG. 2.

As shown in FIGS. 2 and 3, the resistance welding machine has a body member 10 and upper and lower support members 20 and 30 extending transversely from the body member 10.

A lower platen 22 is secured to the lower support member 20, and an upper platen 32 is secured to the upper support member 30 and vertically movably actuated by a cylinder 31. The platens 22 and 32 are provided with shanks 24 and 34, respectively, and electrodes 26 and 36 (electrode pair E in FIG. 1) are attached to the corresponding shanks 24 and 34. A displacement sensor 38 is attached to the upper support member 30 so as to continuously detect the position or displacement of the upper platen 32.

When the cylinder 31 is driven, the upper platen 32 is moved downwardly, until the electrodes 26 and 36 clamp workpieces W therebetween, and welding current from a power circuit 41 (current supply means C in FIG. 1) is supplied through the electrodes 26 and 36 to weld the workpieces W.

The displacement of the upper platen 32 corresponds to the size of clearance between the electrodes 26 and 36, and micro change in the distance between the electrodes 26 and 36 experienced from when the upper electrode 36 is brought in contact with the upper workpiece W until when the workpieces W are stably clamped by the electrodes 26 and 36 corresponds to change in the clamping force applied on the workpieces W by the electrodes 26 and 36. Thus, the micro displacement of the upper platen 32 corresponds to the clamping force representing value. The displacement sensor 38 corresponds to the clamping force representing value measuring means A in FIG. 1.

The body member 10 includes a microcomputer 40. As shown in FIG. 3, the microcomputer 40 is connected with the power circuit 41 and the displacement sensor 38. The microcomputer 40 is also connected with a starting switch 42 disposed at an appropriate position in the resistance welding machine, a keyboard 44, a display device 46, a recording device 47 and an abnormal signal output device 48.

Figure 4:
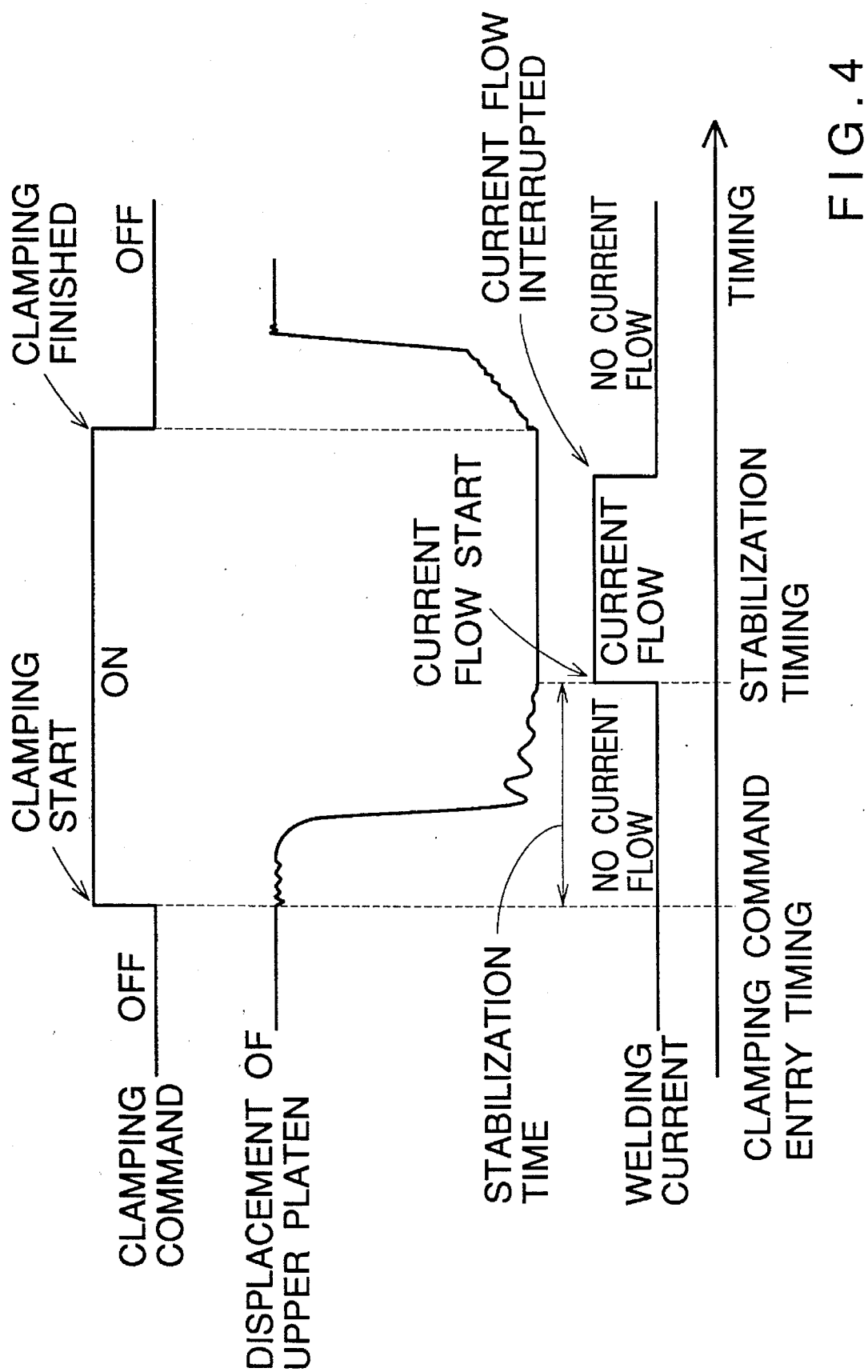
FIG. 4 is a graph illustrating displacement of an upper platen of the resistance welding machine in FIGS. 2 and 3.

This resistance welding machine is controlled as will be described with reference to FIGS. 4 and 5. At first, the procedure operated under normal condition is explained.

When the microcomputer 40 receives an ON signal (clamping command) from the starting switch 42 (this timing is referred to as the clamping command entry timing), the microcomputer 40 discriminates as "yes" in Step S2, and the cylinder 31 is driven to start clamping in Step S4. Then, after a slight time lag, the upper platen 32 rapidly moves downwardly. In Step S5, the microcomputer 40 waits until the time lag has elapsed.

The upper platen 32 rapidly moves downwardly, until it strikes the workpieces W, causing bounding which is gradually decreased to be finally converged on a predetermined position, as the inner pressure of the cylinder 31 increases. Thus, the position of the upper platen 32 is stabilized to the predetermined position (this timing is referred to as stabilized timing), and thereafter, the workpieces W are kept properly or stably clamped by the electrodes 26 and 36.

Control proceeds through Step S6 to Step S8 in which the microcomputer 40 discriminates whether the displacement of the upper platen 32 is stabilized or not, or whether the displacement rate of the upper platen 32 calculated by time differentiation of the displacement substantially equals to zero or not. The microcomputer 40 discriminates as "no" in Step S8 during the time from the start of clamping until the stabilized timing, but it discriminates as "yes" after the stabilized timing. This Step S8 corresponds to the clamping force representing value discriminating means B in FIG. 1.

When the microcomputer 40 discriminates as "yes" in Step S8, showing that the workpieces W are properly or stably clamped by the electrodes 26 and 36, control proceeds through Step S10 to Step S12 in which the computer 40 transmits an ON signal to the power circuit 41, and allows welding current to flow through the electrodes 26 and 36.

When it is discriminated that the welding operation has been completed in Step S14, welding current flow through the electrodes 26 and 36 is interrupted in Step S16, and the cylinder is driven upwardly, causing the upper platen 32 to move upwardly therewith, so that clamping under pressure is terminated in Step S18. Thus, the entire welding operation is finished.

As described above, based on the fact that stabilization of the displacement of the upper platen 32 or substantially zero displacement rate thereof corresponds to the condition in which the workpieces W are properly or stably clamped, the resistance welding machine of the present invention causes welding current flow through the electrodes 26 and 36 to be automatically started just after the stabilized timing. Specifically, in various welding conditions, regardless of any difference in thickness of workpieces W or other welding environments, substantially zero displacement rate of the upper platen 32 directly corresponds to proper clamping of the workpieces W by the electrodes 26 and 36. Therefore, starting of welding current flow just after the stabilized timing can meet the requirements that welding current flow must be started after the workpieces W are properly clamped and that welding current flow must be started just after the workpieces W are properly clamped. Thus, welding current flow is prevented from being started before the workpieces W are properly clamped, and at the same time, the machine can prevent inefficiency of operation. That is, the machine operation will be inefficient when the machine takes a long time to start welding current flow after the workpieces W are properly clamped. Thus, under various welding conditions, the resistance welding machine can automatically start current flow at a proper timing, assuring proper welding to be performed efficiently.

Figure 5:
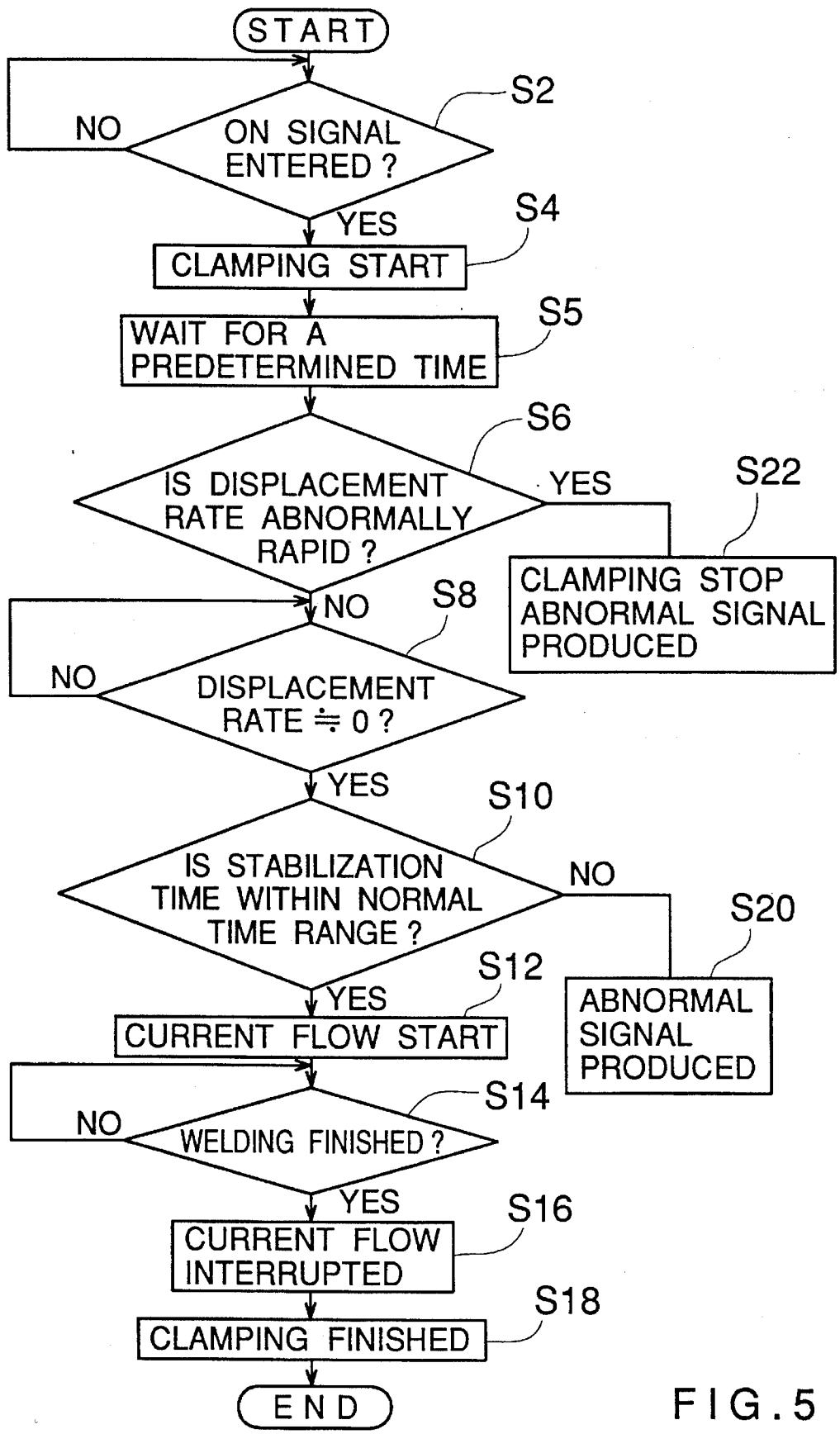
FIG. 5 is a flow chart illustrating the control of the resistance welding machine in FIGS. 2 and 3.

In Step S10 in FIG. 5, the microcomputer 40 discriminates whether the stabilization time (squeezing time) from the clamping command entry timing until the stabilized timing is within a predetermined normal time range or not. Specifically, if the stabilization time is abnormally long or short due to, for example, malfunction of the cylinder 31 or others, the microcomputer 40 discriminates as "no" in Step S10, and an abnormal signal output device 48 produces an abnormal signal in Step S20. In case the upper platen 32 cannot move at all due to malfunction of the cylinder 31 or others, the microcomputer 40 discriminates as "yes" in Step S8 and then discriminates that the stabilization time is abnormally short, producing an abnormal signal. Thus, Step S10 corresponds to the stabilization time discriminating means L in FIG. 1.

In case of abnormally rapid displacement rate due to malfunction of the cylinder 31 or others, the computer discriminates as "yes" in Step S6 and the cylinder 31 is stopped to interrupt application of the clamping force and an abnormal signal is produced in Step S22.

In the resistance welding machine as described above, when an ON signal from the starting switch 42 is entered, current flow is automatically started at a predetermined proper timing, with backup function prepared for any malfunction in automated operation.

The normal time range of the stabilization time is specified as follows. Specifically, when a welding operation is performed, the stabilization time is displayed on the display device 46 or recorded by the recording device 47. Thus, data of the stabilization time is obtainable for each welding operation. The value of the normal time range can be entered through the keyboard 44 on the basis of a plurality of data.

Similarly, the displacement rate is displayed on the display device 46 or recorded by the recording device 47. The allowable maximum rate which is used as a standard for discriminating the displacement rate in Step S6 can be entered through the keyboard 44 on the basis of the obtained data.

The present invention is not to be limited to the embodiment as described above, but can be carried out in other embodiments. For example, the pressure in the cylinder 31 may be used as the clamping force representing value corresponding to the clamping force, because there is a direct correlation between the clamping force applied on the workpieces W by the electrodes 26 and 36 and the pressure in the cylinder 31. Alternatively, a strain sensor may be attached to the upper support member 30 so that the detected strain can be used as the clamping force representing value. It is because, as the pressure in the cylinder 31 is increased to tightly clamp the workpieces W, the upper support member 31 is gradually strained upwardly, and there is an indirect correlation between the detected strain and the clamping force.

As described above, the present invention is effective to start welding current flow just after the workpieces are properly or stably clamped by the electrodes, regardless of any difference in welding conditions including the thickness and material of the workpieces. This eliminates the necessity of entering a constant for discriminating whether the workpieces are properly clamped, such as the elapsed time from the clamping command entry timing, whenever the thickness of the workpieces or the driving speed of the cylinder is varied. Thus, the operational efficiency of the machine can be considerably improved in welding in various welding conditions.

Furthermore, the present invention is effective to detect occurrence of any abnormality, assuring normal operation to be kept in the automated welding operation.

While the invention has been described with reference to a preferred embodiment thereof, it is to be understood that modifications or variations may be easily made without departing from the scope of the present invention which is defined by the appended claims.

What is claim is:

1. A resistance welding machine including a pair of electrodes between which workpieces are clamped and are welded by welding current supplied through the electrodes, said resistance welding machine comprising:

clamping force measuring means for measuring a clamping fore applied to the workpieces by the electrodes;

clamping force discriminating means responsive to the clamping force measured by said clamping force measuring means for determining whether the clamping force measured by said clamping force measuring means is fluctuating or is stabilized; and current supply means for supplying the welding current to the electrodes when the clamping force discriminating means determines that the clamping force is stabilized.

2. The resistance welding machine as defined in claim 1, wherein the clamping force measuring means measures a distance between the electrodes.

3. The resistance welding machine as defined in claim 1, wherein the clamping force measuring means measures pressure in a cylinder for moving one of the electrodes.

4. The resistance welding machine as defined in claim 1, wherein the clamping force measuring means measures a strain developed in a member supporting one of the electrodes.

5. The resistance welding machine as defined in claim 1, further comprising stabilization time discriminating means for determining whether or not a stabilization time is within a predetermined range, the stabilization time being measured from a clamping command entry time when the clamping command is entered to a stabilization time when said clamping force discriminating means determines that the clamping force is stabilized.

6. The resistance welding machine as defined in claim 5, further comprising abnormal signal output means for outputting an abnormal signal when said stabilization time discrimination means determines that the stabilization time is not within the predetermined time range.

7. The resistance welding machine as defined in claim 1, wherein said clamping force discriminating means determines, directly from the clamping force measured by the clamping force measuring means, whether the clamping force is fluctuating or stabilized.

8. The resistance welding machine as defined in claim 7, wherein said clamping force discriminating means determines whether a first derivative with respect to time of the clamping force is non-zero indicating continued fluctuation of the clamping force, or whether the first derivative with respect to time of the clamping force is zero indicating stabilization of the clamping force.

\* \* \* \* \*

UNITED STATES PATENT AND TRADEMARK OFFICE
CERTIFICATE OF CORRECTION

PATENT NO.   : 5,471,028
DATED        : November 28, 1995
INVENTOR(S)  : Shingo KAWAI It is certified that error appears in the above-indentified patent and that said Letters Patent is hereby corrected as shown below:

Column 6, line 22, "fore" should read --force--.

Signed and Sealed this

Seventh Day of May, 1996

Attest:

BRUCE LEHMAN

Attesting Officer

Commissioner of Patents and Trademarks